US010880091B2

(12) United States Patent
Zhou et al.

(10) Patent No.: US 10,880,091 B2
(45) Date of Patent: Dec. 29, 2020

(54) CONTROL METHOD FOR ENROLLING FACE TEMPLATE DATA AND RELATED PRODUCT

(71) Applicant: GUANGDONG OPPO MOBILE TELECOMMUNICATIONS CORP., LTD., Guangdong (CN)

(72) Inventors: Haitao Zhou, Guangdong (CN); Ziqing Guo, Guangdong (CN); Jian Wang, Guangdong (CN); Kui Jiang, Guangdong (CN); Fangfang Hui, Guangdong (CN); Lizhong Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 195 days.

(21) Appl. No.: 16/115,458

(22) Filed: Aug. 28, 2018

(65) Prior Publication Data

US 2019/0116043 A1 Apr. 18, 2019

(30) Foreign Application Priority Data

Oct. 18, 2017 (CN) .......................... 2017 1 0969234

(51) Int. Cl.
*H04L 29/06* (2006.01)
*H04L 9/32* (2006.01)
(Continued)

(52) U.S. Cl.
CPC ............ *H04L 9/3231* (2013.01); *G06F 21/32* (2013.01); *G06K 9/00221* (2013.01);
(Continued)

(58) Field of Classification Search
CPC ... H04L 9/3231; H04L 9/0861; H04L 9/3271; G06K 9/00221; G06K 9/00926;
(Continued)

(56) References Cited

U.S. PATENT DOCUMENTS 7,289,964 B1 * 10/2007 Bowman-Amuah ........................ G06F 9/5038
705/1.1
9,122,857 B1 9/2015 Hassan et al.
(Continued)

FOREIGN PATENT DOCUMENTS

CN 103873247 6/2014
CN 105809433 A 7/2016
(Continued)

OTHER PUBLICATIONS

Chinese Patent Application No. 201710969234.0 English translation of Office Action dated Mar. 13, 2019, 10 pages.
(Continued)

*Primary Examiner* — Mahfuzur Rahman
(74) *Attorney, Agent, or Firm* — Lathrop GPM LLP (57) ABSTRACT

Embodiments of the present disclosure provide a control method for enrolling face template data and related products. The control method includes: controlling a face image collection device to capture a face image and generate face template data; acquiring via the face recognition service a dynamic check token sent by the face recognition trusted application; sending a face template enrolling command carrying the dynamic check token and the face template data to the face recognition trusted application via the face recognition service; and verifying the dynamic check token in the face template enrolling command is valid and storing the face template data in the security system via the face recognition trusted application.

20 Claims, 6 Drawing Sheets

(51) Int. Cl.
*G06K 9/00* (2006.01)
*G06F 21/32* (2013.01)
*H04L 9/08* (2006.01)

(52) U.S. Cl.
CPC ..... *G06K 9/00268* (2013.01); *G06K 9/00926* (2013.01); *H04L 9/0861* (2013.01); *H04L 9/3271* (2013.01)

(58) Field of Classification Search
CPC ...... G06K 9/00268; G06F 21/32; H04M 1/67; H04M 1/72577
See application file for complete search history.

(56) References Cited

U.S. PATENT DOCUMENTS

| | | | | |
|---|---|---|---|---|
| 10,521,777 | B2* | 12/2019 | Zhou | G06Q 20/326 |
| 10,601,821 | B2* | 3/2020 | Du | G06K 9/00241 |
| 2003/0163739 | A1 | 8/2003 | Armington et al. | |
| 2004/0005086 | A1 | 1/2004 | Wolff et al. | |
| 2005/0055582 | A1* | 3/2005 | Bazakos | G06F 21/35 |
| | | | | 726/19 |
| 2006/0082439 | A1* | 4/2006 | Bazakos | G06K 9/00228 |
| | | | | 340/5.82 |
| 2008/0037836 | A1* | 2/2008 | Chen | G06K 9/00281 |
| | | | | 382/118 |
| 2011/0298935 | A1* | 12/2011 | Segal | H04N 5/2222 |
| | | | | 348/207.1 |
| 2015/0347734 | A1* | 12/2015 | Beigi | H04L 9/3263 |
| | | | | 713/155 |
| 2017/0134566 | A1 | 5/2017 | Chiang | |
| 2017/0161551 | A1* | 6/2017 | Wang | G06K 9/52 |
| 2018/0158036 | A1* | 6/2018 | Zhou | H04L 9/0861 |
| 2019/0102756 | A1* | 4/2019 | Zhou | G06Q 20/3278 |

FOREIGN PATENT DOCUMENTS

| | | |
|---|---|---|
| CN | 106897164 A | 6/2017 |
| CN | 107092819 | 8/2017 |
| CN | 107818253 | 3/2018 |
| EP | 2924604 A1 | 9/2015 |

OTHER PUBLICATIONS

Chinese Patent Application No. 201710969234.0 Office Action dated Mar. 13, 2019, 8 pages.
European Patent Application No. 18189334.8 extended Search and Opinion dated Mar. 19, 2019, 7 pages.
PCT/CN2018/102018 English Translation of the International Search Report and Written Opinion dated Nov. 22, 2018, 11 pp.
Indian Patent Application No. 201834030552 Office Action dated Jul. 21, 2020, 5 pages.

* cited by examiner

CONTROL METHOD FOR ENROLLING FACE TEMPLATE DATA AND RELATED PRODUCT

CROSS-REFERENCE TO RELATED APPLICATIONS

This application is based on and claims priority of Chinese Patent Application No. 201710969234.0, filed on Oct. 18, 2017, the entire contents of which are incorporated herein by reference.

FIELD

The present disclosure relates to mobile terminal technologies, and more particularly to a control method for enrolling face template data and related products.

BACKGROUND

With popularization of the smart phone, more and more applications are supported by the smart phone, functions of the smart phone become increasingly powerful, and the smart phone is developed towards diversification and individuation, such that the smart phone becomes an essential electronic equipment in user's life.

At present, with higher and higher security requirements of the smart phone, various of unlocking methods with biological information are generated, for example, unlocking method with fingerprint, unlocking method with human face, unlocking method with iris etc. Since the unlocking method with human face has a fast speed and a high success rate for unlocking, the unlocking method with human face becomes the primary choice of the smart phone.

DISCLOSURE

Embodiments of the present disclosure provide a control method for enrolling face template data and related products.

Embodiments of the present disclosure provide a mobile terminal. The mobile terminal includes a processor, a face image collection device and a memory coupled to the processor. An Android system and a security system are running in the mobile terminal. A face recognition service is running in the Android system, and a face recognition trusted application is running in the security system. The face image collection device is configured to collect a face image. The face image is used to extract face template data. The memory is configured to store the face template data. The processor is configured to perform following operations: controlling the face image collection device to capture the face image and generate the face template data; acquiring, via the face recognition service, a dynamic check token sent by the face recognition trusted application; sending a face template enrolling command to the face recognition trusted application via the face recognition service, the face template enrolling command carrying the dynamic check token and the face template data; and verifying the dynamic check token in the face template enrolling command is valid and storing the face template data in the security system via the face recognition trusted application.

Embodiments of the present disclosure provide a control method for enrolling face template data applicable to a mobile terminal. An Android system and a security system are running in the mobile terminal. A face recognition service is running in the Android system, and a face recognition trusted application is running in the security system. The method includes: controlling a face image collection device to capture a face image and generate face template data; acquiring via the face recognition service, a dynamic check token sent by the face recognition trusted application; sending a face template enrolling command to the face recognition trusted application via the face recognition service, the face template enrolling command carrying the dynamic check token and the face template data; and verifying the dynamic check token in the face template enrolling command is valid and storing the face template data in the security system via the face recognition trusted application.

In a fifth aspect, embodiments of the present disclosure provide a non-transitory computer-readable storage medium, having a computer program for electronic data exchange stored thereon. The computer program causes a computer to perform all or a part of the acts in the method described above. The computer includes a mobile terminal.

BRIEF DESCRIPTION OF THE DRAWINGS

To illustrate the solutions according to the embodiments of the present disclosure more clearly, accompanying drawings needed for describing the embodiments are briefly introduced below. Obviously, the accompanying drawings in the following descriptions are merely some embodiments of the present disclosure, and persons of ordinary skill in the art may obtain other drawings according to the accompanying drawings without making creative efforts.

EMBODIMENTS OF THE PRESENT DISCLOSURE

The solutions of the embodiments of the present disclosure are clearly and completely described below with reference to the accompanying drawings in the embodiments of the present disclosure. Obviously, the described embodiments are merely part of rather than all of the embodiments of the present disclosure. All other embodiments obtained by persons of ordinary skill in the art based on the embodiments of the present disclosure without making creative efforts shall fall within the protection scope of the present disclosure.

In addition, terms such as "first" and "second" are used herein for purposes of description and are not intended to indicate or imply relative importance or significance. As used herein, the terms "comprises," "includes," or any other variation thereof, refer to a non-exclusive inclusion. For example, a process, method, article, or apparatus that comprises a given list of elements is not necessarily limited to only those elements given, but may further include other elements not expressly listed or inherent to such process, method, article, or apparatus.

Reference throughout this specification to "embodiment," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or separated or alternative embodiment of the present disclosure. Furthermore, the particular features, structures, materials, or characteristics may be combined in any suitable manner in one or more embodiments or examples.

The mobile terminal involved in embodiments of the present disclosure may include a handheld device, a vehicle-mounted device, a wearable device and a computing device having wireless communication function, or another processing device coupled to a wireless modem, a user equipment (UE) in a variety of forms, a mobile station (MS) and a terminal device and the like. For ease of description, the devices mentioned above are collectively called as mobile terminal.

The mobile terminal involved in embodiments of the present disclosure is provided with a face image collection device, which may be a general camera assembly, for example, a front camera. Embodiments of the present disclosure will be described in the following.

Figure 1:
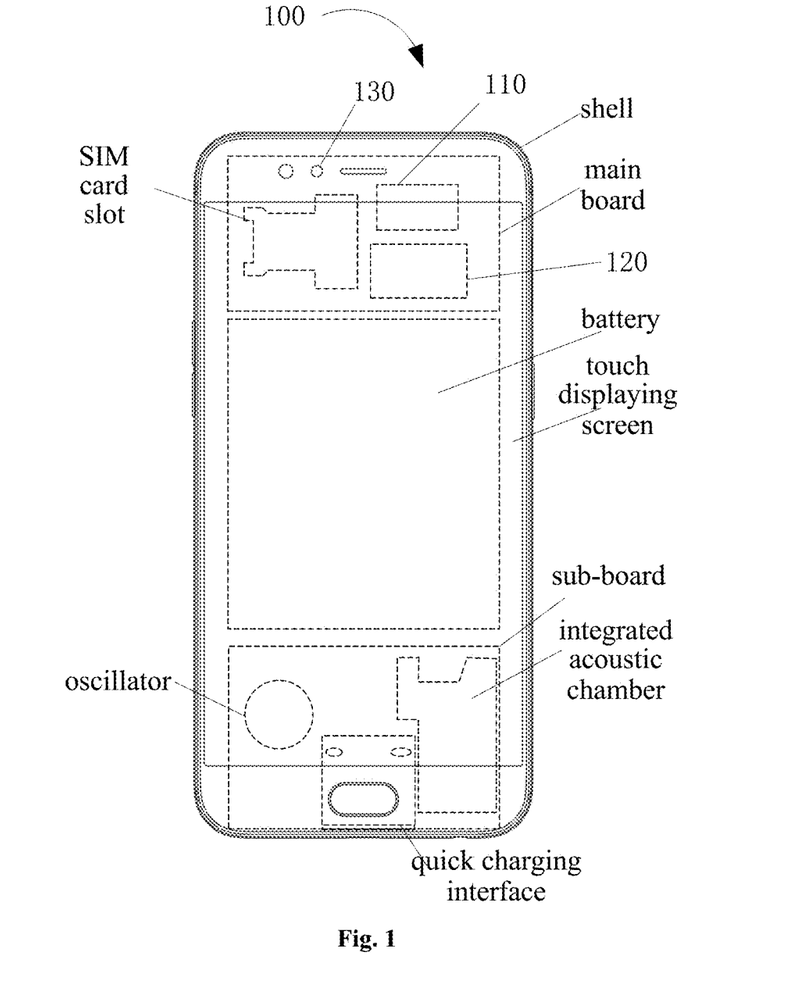
FIG. 1 is a schematic diagram of a mobile terminal according to an embodiment of the present disclosure.

Referring to FIG. 1, FIG. 1 is a schematic diagram of a mobile terminal 100 according to an embodiment of the present disclosure. The mobile terminal 100 includes a shell, a touch displaying screen, a main board, a battery, and a sub-board. The main board is provided with a processor 110, a memory 120, a face image collection detection 130, a SIM card slot and the like. The sub-board is provided with an oscillator, an integrated acoustic chamber, and a VOOC quick charging interface.

The face image collection device 130 is configured to collect a face image. The human face image can be used to extract face template data.

The memory 120 is configured to store the face template data.

The processor 110 is configured to control the face image collection device 130 to capture the face image and generate the face template data, to acquire via face recognition service (FS) a dynamic check token sent by a face recognition trusted application (FTA), to send a face template enrolling command carrying the dynamic check token and the face template data to the face recognition trusted application via the face recognition service, to verify the dynamic check token in the face template enrolling command is valid and store the face template data in a security system via the face recognition trusted application.

The processor 110 is a control center of the mobile terminal, which can use various interfaces and wires to couple respective parts of the mobile terminal, and perform various functions and processing data of the mobile terminal by running or executing software programs and/or modules stored in the memory 120 and calling data stored in the memory 120, so as to monitor the mobile terminal overall. In an embodiment, the processor 110 may integrate an application processor and a modem processor, in which the application processor is mainly configured to process the operating system, the user interface and applications, and the modem processor is mainly configured to process wireless communication. It could be understood that the above-described modem processor may be not integrated in the processor 110.

The memory 120 may be configured to store a software program and modules. The processor 110 runs the software program and modules stored in the memory 120, to implement various functional applications and data processes of the mobile terminal. The memory 120 may mainly include a program storage area and a data storage area. The program storage area may store an operating system, an application program required by at least one function and the like. The data storage area may store data created according to usage of the mobile phone, and the like. In addition, the memory 120 may include a high speed random access memory, and may also include a non-volatile memory such as at least one magnetic disk storage device, a flash memory, or another volatile solid-state storage device.

In embodiments of the present disclosure, the mobile terminal controls the face image collection device to capture the face image and generate the face template data, acquires via the face recognition service the dynamic check token sent by the face recognition trusted application, sends via the face recognition service the face template enrolling command carrying the dynamic check token and the face template data to the face recognition trusted application, and verifies via the face recognition trusted application the dynamic check token in the face template enrolling command is valid (or legitimate) and stores the face template data in the security system. Since a verification mechanism using the dynamic check token is required to verify the validity (i.e., legitimacy) of data transmission when the face recognition service sends face template data to the face recognition trusted application, a situation in which invalid (i.e., illegitimate) service transmits fake face template data to enroll the face data can be avoided, thereby preventing a face template library of the mobile terminal from being cracked and utilized, and improving security of the mobile terminal enrolling the face template data.

In a possible embodiment, the before the processor acquires via the face recognition service the dynamic check token sent by the face recognition trusted application, the processor is further configured to: send via the face recognition service a template enrolling authorization request to the face recognition trusted application; receive via the face recognition trusted application the template enrolling authorization request to generate a challenge factor and send the challenge factor to the face recognition service; send via the face recognition service a template enrolling verification request carrying the challenge factor to the face recognition trusted application; and receive via the face recognition trusted application the template enrolling verification request, verify that the challenge factor is valid, generate the dynamic check token and send the dynamic check token to the face recognition service.

In a possible embodiment, when generating via the face recognition trusted application the dynamic check token, the processor is configured to: generate via the face recognition trusted application an unused reference dynamic token; and generate the dynamic check token by calling a first shared key in the security system to encrypt the unused reference dynamic token.

In a possible embodiment, after verifying via the face recognition trusted application that the dynamic check token in the face template enrolling command is valid and storing the face template data in the security system, the processor is further configured to: perform at least once predetermined data collection process in a predetermined time period, until a face template with integrity greater than a predetermined threshold is formed based on a plurality of pieces of face template data acquired by the face recognition trusted application. The predetermined data collection process includes: controlling the face image collection device to capture the face image and generate the face template data; sending via the face recognition service a reference face template enrolling command carrying the face template data to the face recognition trusted application; and receiving via the face recognition trusted application the reference face template enrolling command and store the face template data.

In a possible embodiment, the challenge factor is a hexadecimal random number. The hexadecimal random number is encrypted and decrypted with a second shared secret key in the face recognition trusted application.

Figure 2A:
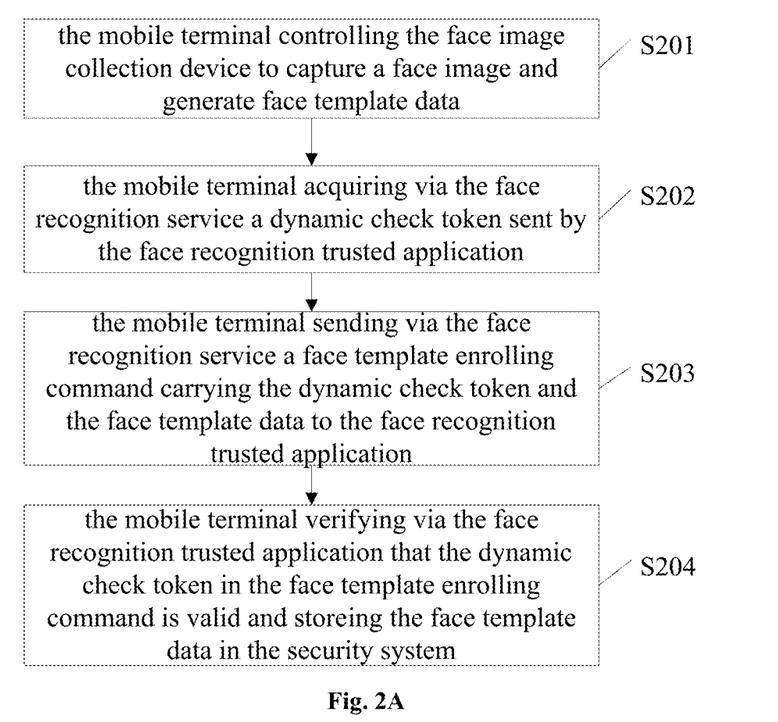
FIG. 2A is a flow chart of a control method for enrolling face template data according to an embodiment of the present disclosure.

Referring to FIG. 2A, FIG. 2A is a flow chart of a control method for enrolling face template data according to an embodiment of the present disclosure. The method is applicable to a mobile terminal. An Android system and a security system are running in the mobile terminal. Face recognition service is running in the Android system. A face recognition trusted application is running in the security system. The control method includes the following.

At block S201, the mobile terminal controls the face image collection device to capture a face image and generate face template data.

In practical, when detecting a face template enrolling command from a user, the mobile terminal turns on the front face image collection device to collect the face image of the user, and extracts the face template data from the face image based on a predetermined data processing algorithm.

Figure 2B:
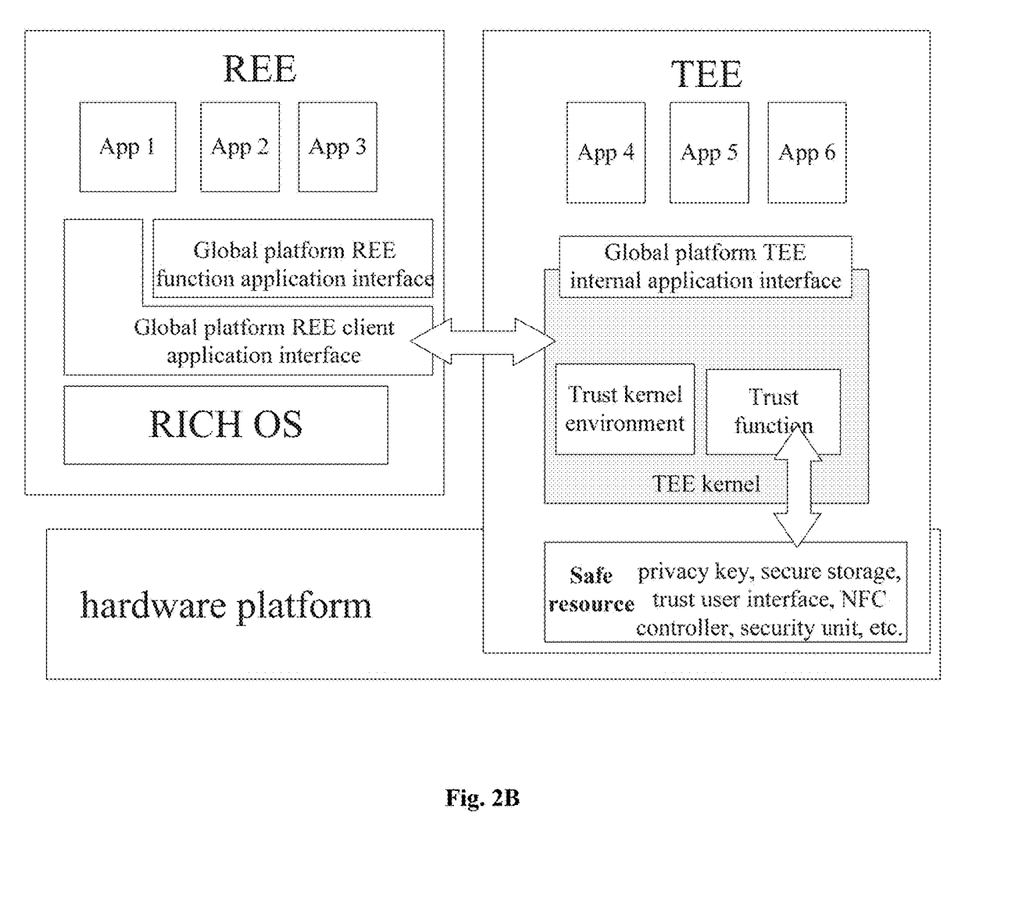
FIG. 2B is a schematic diagram of architecture of an Android system and a security system according to an embodiment of the present disclosure.

The face template needs to be enrolled into a security system of the mobile terminal to improve security of related operations on the face template. As illustrated in FIG. 2B, a rich execution environment (REE) and a trust execution environment (TEE) are running in the mobile terminal. TEE has its own execution space, which means that an operating system exists in TEE. TEE has a higher security level than Rich OS (general operating system). Software and hardware resource accessible by TEE is independent of Rich OS. TEE provides a security execution environment for a trusted application TA, and further protects security, integrity and access authorization of resource and data of TA. In order to ensure root of trust of TEE, TEE needs to be verified and separated from an Android system during a security latching process. In TEE, each TA is independent from each other and can be access each other without authorization. The face recognition trusted application is a trust application supported in TEE corresponding to the security system of the mobile terminal.

At block S202, the mobile terminal acquires via the face recognition service a dynamic check token sent by the face recognition trusted application.

The dynamic check token is a temporal token, having a period of validity as a predetermined time period associated with the present communication.

At block S203, the mobile terminal sends via the face recognition service a face template enrolling command carrying the dynamic check token and the face template data to the face recognition trusted application.

At block S204, the mobile terminal verifies via the face recognition trusted application that the dynamic check token in the face template enrolling command is valid and stores the face template data in the security system.

Different dynamic check tokens correspond to different enrolling processes.

In embodiments of the present disclosure, the mobile terminal controls the face image collection device to capture the face image and generate the face template data, acquires via the face recognition service the dynamic check token sent by the face recognition trusted application, sends via the face recognition service the face template enrolling command carrying the dynamic check token and the face template data to the face recognition trusted application, and verifies via the face recognition trusted application the dynamic check token in the face template enrolling command is valid and stores the face template data in the security system. Since a hacker may copy the enrolling process of an enrolled fingerprint to enroll a new face template, a verification mechanism using the dynamic check token is used in embodiments of the present disclosure to verify the valid of data transmission, such that a situation in which invalid service transmits fake face template data to enroll the face data can be avoided, thereby preventing a face template library of the mobile terminal from being cracked and utilized, and improving security of the mobile terminal enrolling the face template data.

In a possible embodiment, before the mobile terminal acquires via the face recognition service the dynamic check token sent by the face recognition trusted application, the control method further includes: the mobile terminal sending via the face recognition service a template enrolling authorization request to the face recognition trusted application; receiving via the face recognition trusted application the template enrolling authorization request to generate a challenge factor and send the challenge factor to the face recognition service; sending via the face recognition service a template enrolling verification request carrying the challenge factor to the face recognition trusted application; and receiving via the face recognition trusted application the template enrolling verification request, verifying that the challenge factor is valid, generating the dynamic check token and sending the dynamic check token to the face recognition service.

The challenge factor is a hexadecimal random number, and the hexadecimal random number is encrypted and decrypted with a second shared secret key in the face recognition trusted application.

In this embodiment, since the dynamic check token needs to be generated by the face recognition trusted application and sent to the face recognition service, the verification mechanism using the challenge factor can ensure security of initial communication between the face recognition service and the face recognition trusted application, such that the security of entire process of enrolling the face template can be improved.

In a possible embodiment, the mobile terminal generating via the face recognition trusted application the dynamic check token includes: the mobile terminal generating via the face recognition trusted application an unused reference dynamic token; generating the dynamic check token by calling a first shared key in the security system to encrypt the unused reference dynamic token.

In this embodiment, since the encryption and decryption of the dynamic check token are realized with the first shared key in the security system and the first shared key cannot be embezzled by any service in the Android system, the security of encryption and decryption process is guaranteed.

In a possible embodiment, after the mobile terminal verifies via the face recognition trusted application that the dynamic check token in the face template enrolling command is valid and stores the face template data in the security system, the control method further includes: the mobile terminal performing at least once predetermined data collection process in a predetermined time period, until a face template with integrity greater than a predetermined threshold is formed based on a plurality of pieces of face template data acquired by the face recognition trusted application. The predetermined data collection process includes: controlling the face image collection device to capture the face image and generate the face template data; sending via the face recognition service a reference face template enrolling command carrying the face template data to the face recognition trusted application; and receiving via the face recognition trusted application the reference face template enrolling command and storing the face template data.

In this embodiment, since the face template data collected by mobile terminal may be not integrated or has interference data (for example, shielded by a hand or an obstacle), the mobile terminal may need to enroll the face template data many times to form relative integrated face template, so as to improve success rate of enrolling the face template.

In a possible embodiment, the challenge factor is a hexadecimal random number, and the hexadecimal random number is encrypted and decrypted with a second shared secret key in the face recognition trusted application.

In this embodiment, since the second shared key of the challenge factor is stored in the security system, the second shared key cannot be embezzled by any service in the Android system, such that the security of encryption and decryption of the challenge factor is improved.

Figure 3:
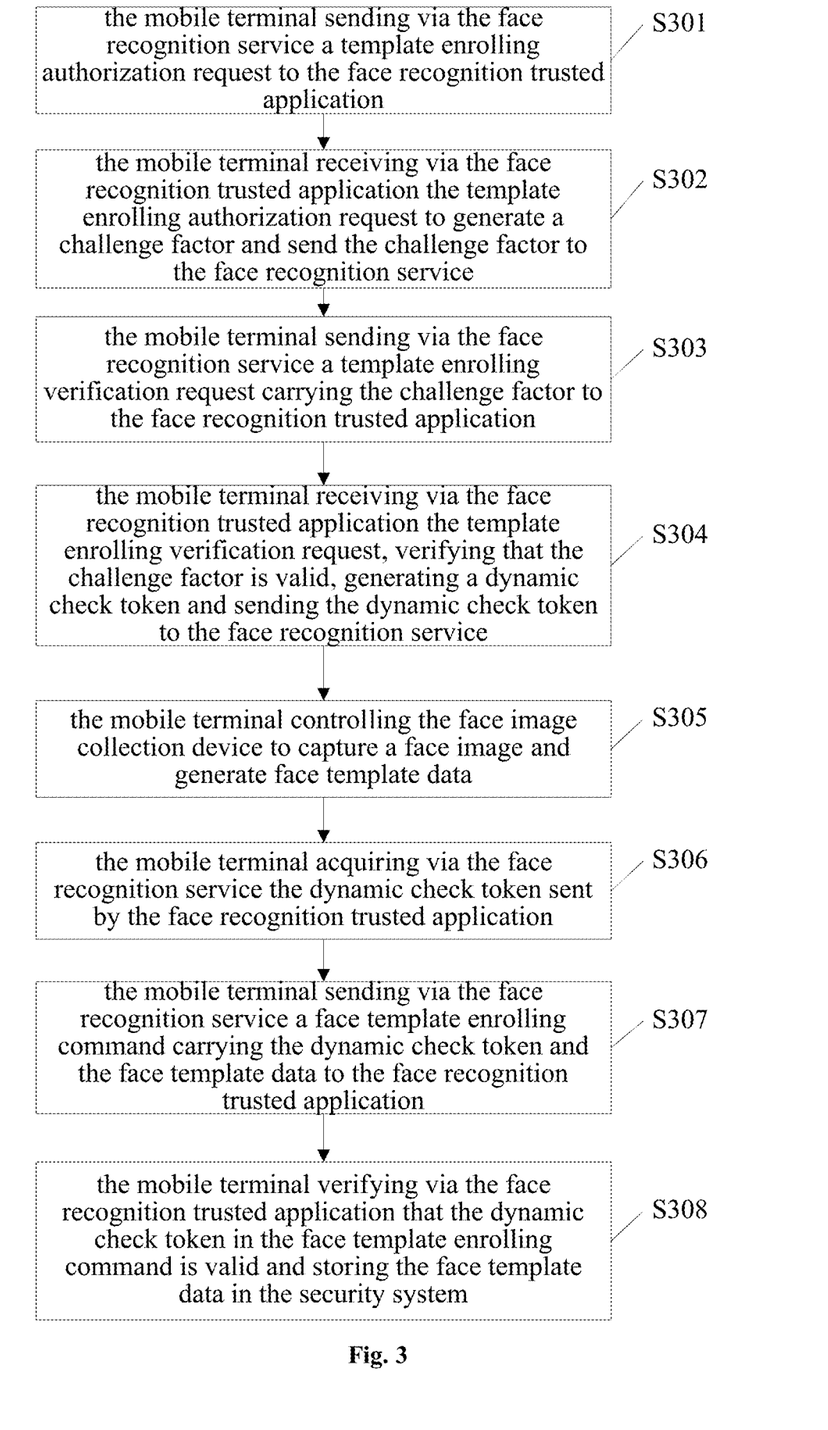
FIG. 3 is a flow chart of a control method for enrolling face template data according to another embodiment of the present disclosure.

Similar to embodiments illustrated in FIG. 2A, referring to FIG. 3, FIG. 3 is a flow chart of a control method for enrolling face template data according to an embodiment of the present disclosure. The method is applicable to a mobile terminal. The mobile terminal runs an Android system and a security system. Face recognition service is running in the Android system, and a face recognition trusted application TA is running in the security system. As illustrated in FIG. 3, the control method includes the following.

At block S301, the mobile terminal sends via the face recognition service a template enrolling authorization request to the face recognition trusted application.

At block S302, the mobile terminal receives via the face recognition trusted application the template enrolling authorization request to generate a challenge factor and send the challenge factor to the face recognition service.

At block S303, the mobile terminal sends via the face recognition service a template enrolling verification request carrying the challenge factor to the face recognition trusted application.

At block S304, the mobile terminal receives via the face recognition trusted application the template enrolling verification request, verifies that the challenge factor is valid, generates a dynamic check token and sends the dynamic check token to the face recognition service.

At block S305, the mobile terminal controls the face image collection device to capture a face image and generate face template data.

At block S306, the mobile terminal acquires via the face recognition service the dynamic check token sent by the face recognition trusted application.

At block S307, the mobile terminal sends via the face recognition service a face template enrolling command carrying the dynamic check token and the face template data to the face recognition trusted application.

At block S308, the mobile terminal verifies via the face recognition trusted application that the dynamic check token in the face template enrolling command is valid and stores the face template data in the security system.

In embodiments of the present disclosure, the mobile terminal controls the face image collection device to capture the face image and generate the face template data, acquires via the face recognition service the dynamic check token sent by the face recognition trusted application, sends via the face recognition service the face template enrolling command carrying the dynamic check token and the face template data to the face recognition trusted application, and verifies via the face recognition trusted application the dynamic check token in the face template enrolling command is valid and stores the face template data in the security system. Since a verification mechanism using the dynamic check token is required to verify the validity of data transmission when the face recognition service sends face template data to the face recognition trusted application, a situation in which invalid service transmits fake face template data to enroll the face data can be avoided, thereby preventing a face template library of the mobile terminal from being cracked and utilized, and improving security of the mobile terminal enrolling the face template data.

Further, since the dynamic check token needs to be generated by the face recognition trusted application and sent to the face recognition service, the verification mechanism using the challenge factor can ensure security of initial communication between the face recognition service and the face recognition trusted application, such that the security of entire process of enrolling the face template can be improved.

Figure 4:
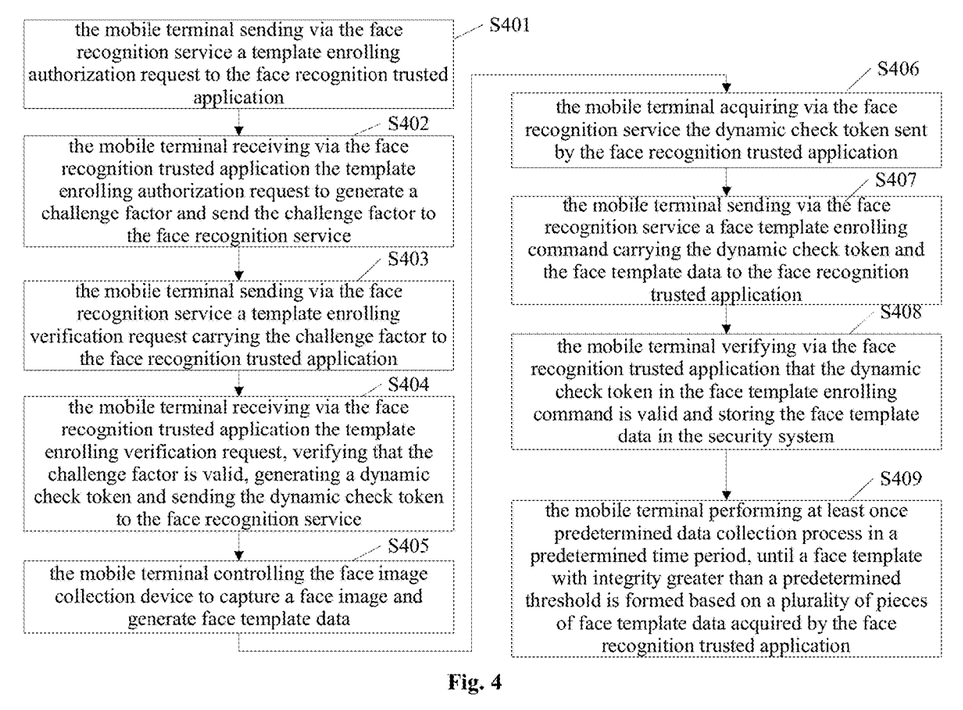
FIG. 4 is a flow chart of a control method for enrolling face template data according to a still embodiment of the present disclosure.

Similar to embodiments illustrated in FIG. 2A, referring to FIG. 4, FIG. 4 is a flow chart of a control method for enrolling face template data according to an embodiment of the present disclosure. The method is applicable to a mobile terminal. The mobile terminal runs an Android system and a security system. Face recognition service is running in the Android system, and a face recognition trusted application TA is running in the security system. As illustrated in FIG. 4, the control method includes the following.

At block S401, the mobile terminal sends via the face recognition service a template enrolling authorization request to the face recognition trusted application.

At block S402, the mobile terminal receives via the face recognition trusted application the template enrolling authorization request to generate a challenge factor and send the challenge factor to the face recognition service.

At block S403, the mobile terminal sends via the face recognition service a template enrolling verification request carrying the challenge factor to the face recognition trusted application.

At block S404, the mobile terminal receives via the face recognition trusted application the template enrolling verification request, verifies that the challenge factor is valid, generates a dynamic check token and sends the dynamic check token to the face recognition service.

At block S405, the mobile terminal controls the face image collection device to capture a face image and generate face template data.

At block S406, the mobile terminal acquires via the face recognition service the dynamic check token sent by the face recognition trusted application.

At block S407, the mobile terminal sends via the face recognition service a face template enrolling command carrying the dynamic check token and the face template data to the face recognition trusted application.

At block S408, the mobile terminal verifies via the face recognition trusted application that the dynamic check token in the face template enrolling command is valid and stores the face template data in the security system.

At block S409, the mobile terminal performs at least once predetermined data collection process in a predetermined time period, until a face template with integrity greater than a predetermined threshold is formed based on a plurality of pieces of face template data acquired by the face recognition trusted application. The predetermined data collection process includes: controlling the face image collection device to capture the face image and generate the face template data; sending via the face recognition service a reference face template enrolling command carrying the face template data to the face recognition trusted application; and receiving via the face recognition trusted application the reference face template enrolling command and storing the face template data.

In embodiments of the present disclosure, the mobile terminal controls the face image collection device to capture the face image and generate the face template data, acquires via the face recognition service the dynamic check token sent by the face recognition trusted application, sends via the face recognition service the face template enrolling command carrying the dynamic check token and the face template data to the face recognition trusted application, and verifies via the face recognition trusted application the dynamic check token in the face template enrolling command is valid and stores the face template data in the security system. Since a verification mechanism using the dynamic check token is required to verify the validity of data transmission when the face recognition service sends face template data to the face recognition trusted application, a situation in which invalid service transmits fake face template data to enroll the face data can be avoided, thereby preventing a face template library of the mobile terminal from being cracked and utilized, and improving security of the mobile terminal enrolling the face template data.

Further, since the dynamic check token needs to be generated by the face recognition trusted application and sent to the face recognition service, the verification mechanism using the challenge factor can ensure security of initial communication between the face recognition service and the face recognition trusted application, such that the security of entire process of enrolling the face template can be improved.

Moreover, since the face template data collected by mobile terminal may be not integrated or has interference data (for example, shielded by a hand or an obstacle), the mobile terminal may need to enroll the face template data many times to form relative integrated face template, so as to improve success rate of enrolling the face template.

Figure 5:
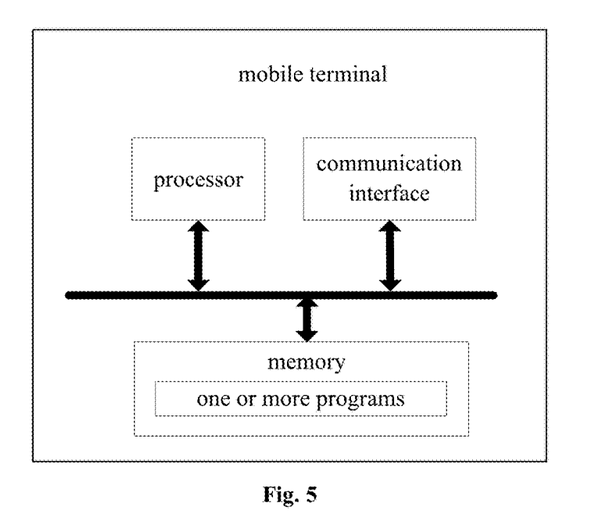
FIG. 5 is a block diagram of a mobile terminal according to an embodiment of the present disclosure.

Similar to embodiments illustrated in FIG. 2A, FIG. 3 and FIG. 4, referring to FIG. 5, FIG. 5 is a schematic diagram of a mobile terminal according to an embodiment of the present disclosure. As illustrated in FIG. 5, the mobile terminal includes a processor, a memory, a communication interface and one or more programs. The one or more programs are stored in the memory, and are configured to be executed by the processor. The one or more programs include instructions for performing the following: controlling a face image collection device to capture a face image and generate face template data; acquiring via the face recognition service a dynamic check token sent by the face recognition trusted application; sending via the face recognition service a face template enrolling command carrying the dynamic check token and the face template data to the face recognition trusted application; and verifying via the face recognition trusted application that the dynamic check token in the face template enrolling command is valid and storing the face template data in the security system.

In embodiments of the present disclosure, the mobile terminal controls the face image collection device to capture the face image and generate the face template data, acquires via the face recognition service the dynamic check token sent by the face recognition trusted application, sends via the face recognition service the face template enrolling command carrying the dynamic check token and the face template data to the face recognition trusted application, and verifies via the face recognition trusted application the dynamic check token in the face template enrolling command is valid and stores the face template data in the security system. Since a verification mechanism using the dynamic check token is required to verify the validity of data transmission when the face recognition service sends face template data to the face recognition trusted application, a situation in which invalid service transmits fake face template data to enroll the face data can be avoided, thereby preventing a face template library of the mobile terminal from being cracked and utilized, and improving security of the mobile terminal enrolling the face template data.

In a possible embodiment, before acquiring via the face recognition service the dynamic check token sent by the face recognition trusted application, the one or more programs include instructions for performing the following: sending via the face recognition service a template enrolling authorization request to the face recognition trusted application; receiving via the face recognition trusted application the template enrolling authorization request to generate a challenge factor and send the challenge factor to the face recognition service; sending via the face recognition service a template enrolling verification request carrying the challenge factor to the face recognition trusted application; and receiving via the face recognition trusted application the template enrolling verification request, verifying that the challenge factor is valid, generating the dynamic check token and sending the dynamic check token to the face recognition service.

In a possible embodiment, when generating via the face recognition trusted application the dynamic check token, the one or more programs include instructions for performing the following: generating via the face recognition trusted application an unused reference dynamic token; generating the dynamic check token by calling a first shared key in the security system to encrypt the unused reference dynamic token.

In a possible embodiment, after verifying via the face recognition trusted application that the dynamic check token in the face template enrolling command is valid and storing the face template data in the security system, the one or more programs include instructions for performing the following: performing at least once predetermined data collection process in a predetermined time period, until a face template with integrity greater than a predetermined threshold is formed based on a plurality of pieces of face template data acquired by the face recognition trusted application. The predetermined data collection process includes:

controlling the face image collection device to capture the face image and generate the face template data; sending via the face recognition service a reference face template enrolling command carrying the face template data to the face recognition trusted application; and receiving via the face recognition trusted application the reference face template enrolling command and storing the face template data.

In a possible embodiment, the challenge factor is a hexadecimal random number, and the hexadecimal random number is encrypted and decrypted with a second shared secret key in the face recognition trusted application.

Figure 6:
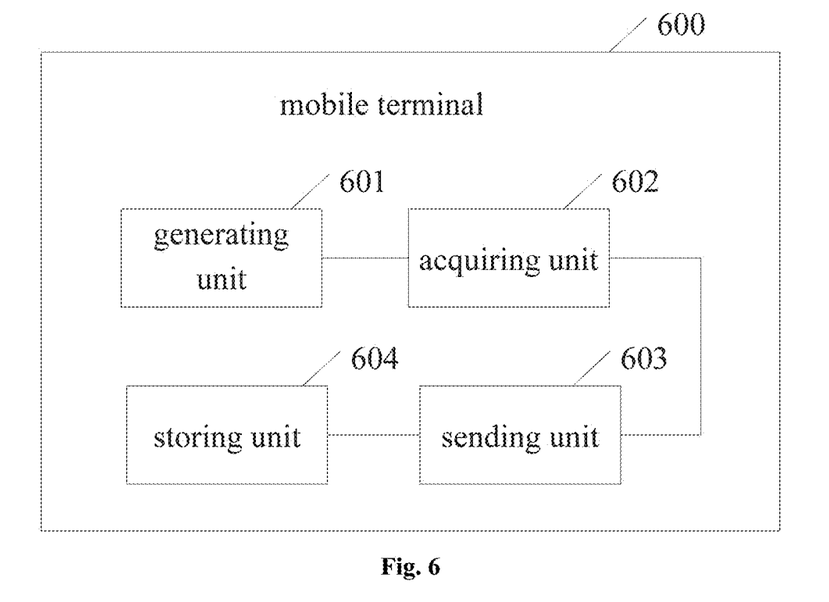
FIG. 6 is a block diagram of functional components in a mobile terminal according to an embodiment of the present disclosure.

Similar to the aforementioned embodiments, FIG. 6 is a block diagram of a mobile terminal according to an embodiment of the present disclosure. The mobile terminal runs an Android system and a security system. Face recognition service is running in the Android system, and a face recognition trusted application TA is running in the security system. The mobile terminal 600 includes a generating unit 601, an acquiring unit 602, a sending unit 603 and a storing unit 604.

The generating unit 601 is configured to control a face image collection device to capture a face image and generate face template data.

The acquiring unit 602 is configured to acquire via the face recognition service a dynamic check token sent by the face recognition trusted application.

The sending unit 603 is configured to send via the face recognition service a face template enrolling command carrying the dynamic check token and the face template data to the face recognition trusted application.

The storing unit 604 is configured to verify via the face recognition trusted application that the dynamic check token in the face template enrolling command is valid and store the face template data in the security system.

In embodiments of the present disclosure, the mobile terminal controls the face image collection device to capture the face image and generate the face template data, acquires via the face recognition service the dynamic check token sent by the face recognition trusted application, sends via the face recognition service the face template enrolling command carrying the dynamic check token and the face template data to the face recognition trusted application, and verifies via the face recognition trusted application the dynamic check token in the face template enrolling command is valid and stores the face template data in the security system. Since a verification mechanism using the dynamic check token is required to verify the validity of data transmission when the face recognition service sends face template data to the face recognition trusted application, a situation in which invalid service transmits fake face template data to enroll the face data can be avoided, thereby preventing a face template library of the mobile terminal from being cracked and utilized, and improving security of the mobile terminal enrolling the face template data.

In a possible embodiment, before the acquiring unit 602 acquires via the face recognition service the dynamic check token sent by the face recognition trusted application, the sending unit 603 is configured to send via the face recognition service a template enrolling authorization request to the face recognition trusted application. The generating unit 601 is configured to receive via the face recognition trusted application the template enrolling authorization request to generate a challenge factor and send the challenge factor to the face recognition service. The sending unit 601 is further configured to send via the face recognition service a template enrolling verification request carrying the challenge factor to the face recognition trusted application. The mobile terminal further includes a verifying unit. The verifying unit is configured to receive via the face recognition trusted application the template enrolling verification request, verify that the challenge factor is valid, generate the dynamic check token and send the dynamic check token to the face recognition service.

In a possible embodiment, when generating via the face recognition trusted application the dynamic check token, the generating unit 601 is configured to: generate via the face recognition trusted application an unused reference dynamic token; generate the dynamic check token by calling a first shared key in the security system to encrypt the unused reference dynamic token.

In a possible embodiment, the mobile terminal further includes a collecting unit. After the verifying unit verifies via the face recognition trusted application that the dynamic check token in the face template enrolling command is valid and stores the face template data in the security system, the collecting unit is configured to: perform at least once predetermined data collection process in a predetermined time period, until a face template with integrity greater than a predetermined threshold is formed based on a plurality of pieces of face template data acquired by the face recognition trusted application. The predetermined data collection process includes: controlling the face image collection device to capture the face image and generate the face template data; sending via the face recognition service a reference face template enrolling command carrying the face template data to the face recognition trusted application; and receiving via the face recognition trusted application the reference face template enrolling command and storing the face template data.

In a possible embodiment, the challenge factor is a hexadecimal random number, and the hexadecimal random number is encrypted and decrypted with a second shared secret key in the face recognition trusted application.

It should be noted that, the mobile terminal in the embodiments of the present disclosure is presented in the form of functional units. The term "unit" used herein should be taken in the broadest possible sense. The functional object for implanting respective "unit", for example, may be an application specific integrated circuit (ASIC), a single circuit, a processor (general, specific or chipset) for executing one or more software or firmware programs and a memory, a combinational logic circuit, and/or other suitable components capable of realizing the abovementioned functions.

The generating unit 601 may be a processor or a controller. The acquiring unit 602 and the sending unit 603 may be a communication interface. The storing unit 604 may be a memory.

Embodiments of the present disclosure also provide a computer storage medium having computer programs for exchanging digital data stored thereon, in which the computer programs are executed to perform all or a part of acts of the method according to the above method embodiments of the present disclosure. The computer includes a mobile terminal.

Embodiments of the present disclosure also provide a computer program product including a non-transitory computer-readable storage medium storing computer programs, in which the computer programs are executed to perform all or a part of acts of the method according to the above method embodiments of the present disclosure. The computer program product may be a software installation package. The computer includes a mobile terminal.

It should be noted that, for convenience and simplicity of description, the above method embodiments are described in a form of a combination of a series of steps. However, those skilled in the art can understand clearly that, the present disclosure is not limited by the order of the steps, since some steps may be performed simultaneously or in other orders according to present disclosure. In addition, those skilled in the art can understand clearly that, the described embodiments are preferred embodiments, of which relative steps or modules may be unnecessary for the present disclosure.

In above embodiments, each embodiment may be described with focusing on different aspects. Parts not be described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or an optical disk.

It should be understood that all or a part of the method provided by the present disclosure may be realized by programs instructing relative hardware, the programs may be stored in a computer-readable memory. The memory may include a flash disk, an ROM, an RAM, a magnet disk, an optical disk and the like.

The forgoing description is only directed to preferred embodiments of the present disclosure, but not used to limit the present disclosure. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure. In conclusion, the specification cannot be construed to limit the present disclosure.

What is claimed is:

1. A mobile terminal, comprising a processor, a face image collection device and a memory coupled to the processor, an Android system and a security system running in the mobile terminal, a face recognition service running in the Android system, a face recognition trusted application running in the security system, wherein, the face recognition trusted application is an application supported in a trust execution environment corresponding to the security system, and the security system is separated from the Android system under the trust execution environment, and
   the face image collection device is configured to collect a face image, wherein the face image is used to extract face template data;
   the memory is configured to store the face template data;
   the processor is configured to perform following operations:
   controlling the face image collection device to capture the face image and generate the face template data;
   acquiring, via the face recognition service, a dynamic check token sent by the face recognition trusted application;
   sending a face template enrolling command to the face recognition trusted application via the face recognition service, the face template enrolling command carrying the dynamic check token and the face template data; and
   verifying the dynamic check token in the face template enrolling command is valid and storing the face template data under the trust execution environment corresponding to the security system via the face recognition trusted application.

2. The mobile terminal according to claim 1, wherein controlling the face image collection device to capture the face image and generate the face template data comprises:
   controlling the face image collection device to capture the face image in response to detecting the face template enrolling command; and
   extracting face feature data from the face image based on a predetermined data processing algorithm to generate the face template data.

3. The mobile terminal according to claim 1, wherein the processor is further configured to perform following operations:
   sending a template enrolling authorization request to the face recognition trusted application via the face recognition service;
   generating a challenge factor according to the template enrolling authorization request, and sending the challenge factor to the face recognition service via the face recognition trusted application;
   sending a template enrolling verification request carrying the challenge factor to the face recognition trusted application via the face recognition service; and
   verifying the challenge factor is valid according to the template enrolling verification request, generate the dynamic check token, and sending the dynamic check token to the face recognition service via the face recognition trusted application.

4. The mobile terminal according to claim 3, wherein generating the dynamic check token via the face recognition trusted application comprises:
   generating a reference dynamic token via the face recognition trusted application; and
   generating the dynamic check token by calling a first shared key in the security system to encrypt the reference dynamic token.

5. The mobile terminal according to claim 1, wherein the processor is further configured to perform following operations:

performing at least once predetermined data collection process in a predetermined time period, until a face template with integrity greater than a predetermined threshold is formed based on a plurality of pieces of face template data acquired by the face recognition trusted application;
wherein the predetermined data collection process comprises:
controlling the face image collection device to capture the face image and generate the face template data;
sending a reference face template enrolling command carrying the face template data to the face recognition trusted application via the face recognition service; and
receiving the reference face template enrolling command and storing the face template data via the face recognition trusted application.

6. The mobile terminal according to claim 1, wherein the challenge factor is a hexadecimal random number, and the hexadecimal random number is encrypted and decrypted with a second shared secret key in the face recognition trusted application.

7. The mobile terminal according to claim 1, wherein the dynamic check token is a temporal token having a period of validity as a predetermined time period associated with a present communication.

8. A control method for enrolling face template data, applicable to a mobile terminal, an Android system and a security system running in the mobile terminal, a face recognition service running in the Android system, a face recognition trusted application running in the security system, wherein, the face recognition trusted application is an application supported in a trust execution environment corresponding to the security system, and the security system is separated from the Android system under the trust execution environment, and the control method comprises:
controlling a face image collection device to capture a face image and generate face template data;
acquiring via the face recognition service, a dynamic check token sent by the face recognition trusted application;
sending a face template enrolling command to the face recognition trusted application via the face recognition service, the face template enrolling command carrying the dynamic check token and the face template data; and
verifying the dynamic check token in the face template enrolling command is valid and storing the face template data under the trust execution environment corresponding to the security system via the face recognition trusted application.

9. The control method according to claim 8, wherein controlling the face image collection device to capture the face image and generate the face template data comprises:
controlling the face image collection device to capture the face image in response to detecting the face template enrolling command; and
extracting face feature data from the face image based on a predetermined data processing algorithm to generate the face template data.

10. The control method according to claim 8, further comprising:
sending a template enrolling authorization request to the face recognition trusted application via the face recognition service;
generate a challenge factor according to the template enrolling authorization request and send the challenge factor to the face recognition service via the face recognition trusted application;
sending a template enrolling verification request carrying the challenge factor to the face recognition trusted application via the face recognition service; and
verifying the challenge factor is according to the template enrolling verification request valid, generating the dynamic check token, and sending the dynamic check token to the face recognition service via the face recognition trusted application.

11. The control method according to claim 10, wherein generating the dynamic check token via the face recognition trusted application comprises:
generating a reference dynamic token via the face recognition trusted application; and
generating the dynamic check token by calling a first shared key in the security system to encrypt the reference dynamic token.

12. The control method according to claim 8, further comprising:
performing at least once predetermined data collection process in a predetermined time period, until a face template with integrity greater than a predetermined threshold is formed based on a plurality of pieces of face template data acquired by the face recognition trusted application;
wherein the predetermined data collection process comprises:
controlling the face image collection device to capture the face image and generate the face template data;
sending a reference face template enrolling command carrying the face template data to the face recognition trusted application via the face recognition service; and
receiving the reference face template enrolling command and storing the face template data via the face recognition trusted application.

13. The control method according to claim 8, wherein the challenge factor is a hexadecimal random number, and the hexadecimal random number is encrypted and decrypted with a second shared secret key in the face recognition trusted application.

14. The control method according to claim 8, wherein the dynamic check token is a temporal token having a period of validity as a predetermined time period associated with a present communication.

15. A non-transitory computer-readable storage medium, having a computer program for electronic data exchange stored thereon, wherein the computer program causes a computer to perform a control method for enrolling face template data, wherein the computer comprises a mobile terminal, an Android system and a security system running in the mobile terminal, a face recognition service running in the Android system, a face recognition trusted application running in the security system, the face recognition trusted application is an application supported in a trust execution environment corresponding to the security system, and the security system is separated from the Android system under the trust execution environment, and the control method comprises:
controlling a face image collection device to capture a face image and generate face template data;
acquiring via the face recognition service, a dynamic check token sent by the face recognition trusted application;
sending a face template enrolling command to the face recognition trusted application via the face recognition service, the face template enrolling command carrying the dynamic check token and the face template data; and verifying the dynamic check token in the face template enrolling command is valid and storing the face template data under the trust execution environment corresponding to the security system via the face recognition trusted application.

16. The non-transitory computer-readable storage medium according to claim 15, wherein controlling the face image collection device to capture the face image and generate the face template data comprises:

controlling the face image collection device to capture the face image in response to detecting the face template enrolling command; and extracting face feature data from the face image based on a predetermined data processing algorithm to generate the face template data.

17. The non-transitory computer-readable storage medium according to claim 15, further comprising:

sending a template enrolling authorization request to the face recognition trusted application via the face recognition service;

generating a challenge factor according to the template enrolling authorization request and send the challenge factor to the face recognition service via the face recognition trusted application;

sending a template enrolling verification request carrying the challenge factor to the face recognition trusted application via the face recognition service; and verifying the challenge factor is valid according to the template enrolling verification request, generating the dynamic check token, and sending the dynamic check token to the face recognition service via the face recognition trusted application.

18. The non-transitory computer-readable storage medium according to claim 17, wherein generating the dynamic check token via the face recognition trusted application comprises:

generating a reference dynamic token via the face recognition trusted application; and generating the dynamic check token by calling a first shared key in the security system to encrypt the reference dynamic token.

19. The non-transitory computer-readable storage medium according to claim 15, further comprising:

performing at least once predetermined data collection process in a predetermined time period, until a face template with integrity greater than a predetermined threshold is formed based on a plurality of pieces of face template data acquired by the face recognition trusted application;

wherein the predetermined data collection process comprises:

controlling the face image collection device to capture the face image and generate the face template data;

sending a reference face template enrolling command carrying the face template data to the face recognition trusted application via the face recognition service; and receiving the reference face template enrolling command and storing the face template data via the face recognition trusted application.

20. The non-transitory computer-readable storage medium according to claim 15, wherein the challenge factor is a hexadecimal random number, and the hexadecimal random number is encrypted and decrypted with a second shared key in the face recognition trusted application.

\* \* \* \* \*